United States Patent

[11] 3,628,316

[72] Inventor John H. Rea, Sr.
Box 86D, Touchet, Wash. 99360
[21] Appl. No. 821,593
[22] Filed May 5, 1969
[45] Patented Dec. 21, 1971

[54] SELF-PROPELLED SWEET CORN HARVESTER
1 Claim, 2 Drawing Figs.
[52] U.S. Cl. ......................................... 56/13.3, 56/119
[51] Int. Cl. .................................................. A01d 45/02
[50] Field of Search .......................................... 56/15, 18, 103, 105, 119, 104, 107; 171/17, 15; 209/136, 137, 138, 139

[56] References Cited
UNITED STATES PATENTS
| | | | |
|---|---|---|---|
| 2,223,704 | 12/1940 | Powell | 56/104 |
| 3,462,921 | 8/1969 | Meredith | 56/107 |
| 3,499,272 | 3/1970 | Looker | 56/18 |
| 2,131,273 | 9/1938 | Coultas et al. | 56/18 |
| 2,660,016 | 11/1953 | Richey | 56/18 |
| 2,661,586 | 12/1953 | Krause et al. | 56/18 |
| 3,271,940 | 9/1966 | Ashton et al. | 56/119 |
| 3,429,438 | 2/1969 | Palmer et al. | 209/137 |
| 3,469,691 | 9/1969 | Boyce | 171/17 |

*Primary Examiner*—Antonio F. Guida
*Attorney*—Gerhardt, Greenlee & Farris

ABSTRACT: A self-propelled sweet corn harvester with a multiple row harvesting head having snapping rolls and gathering chains, a cleaning means with an auger for ejecting stalks and a fan to blow light trash from the harvested ears of corn, a bin for temporary storage of ears of unhusked green corn, and a conveyor to unload the bin.

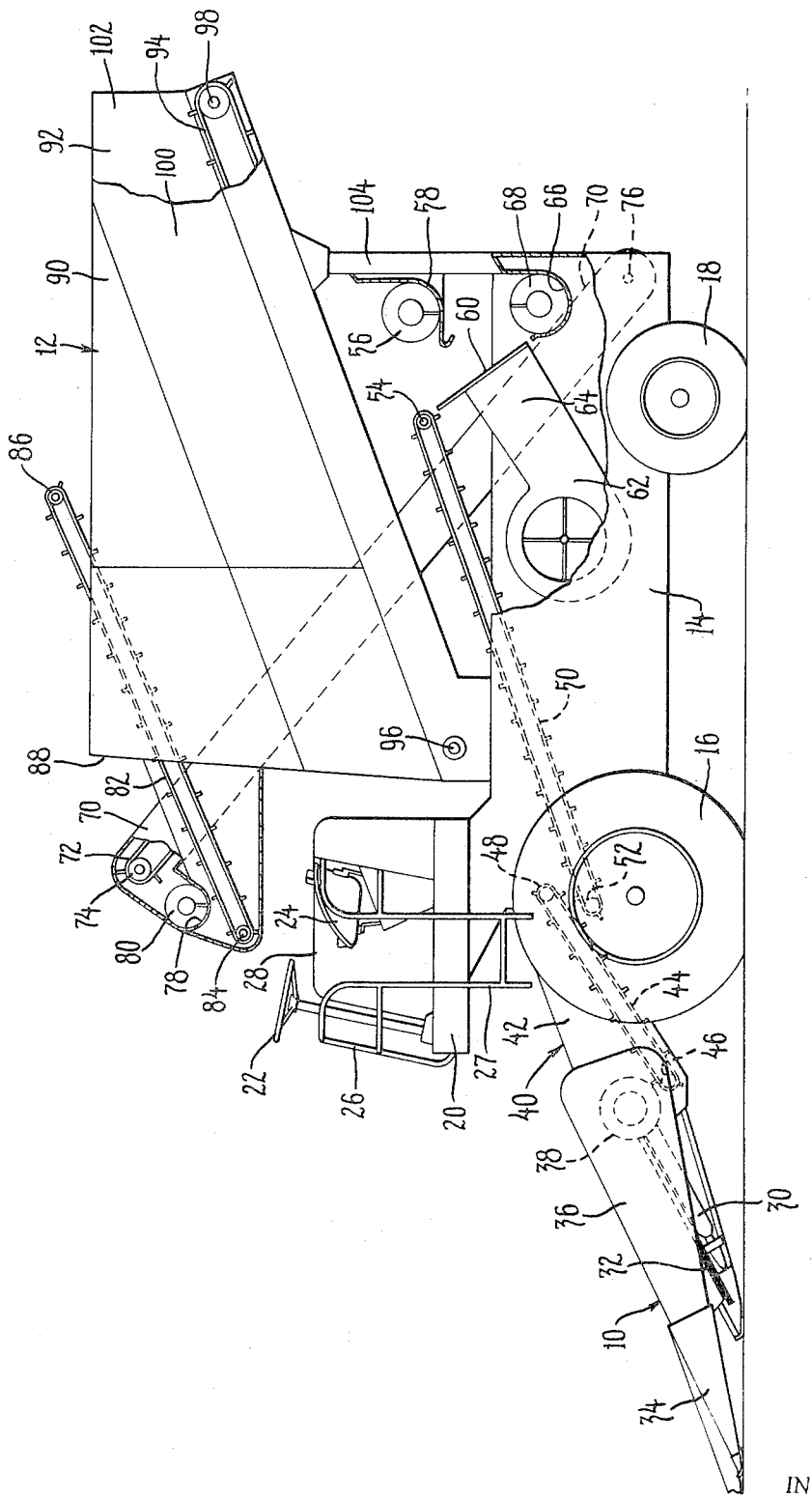

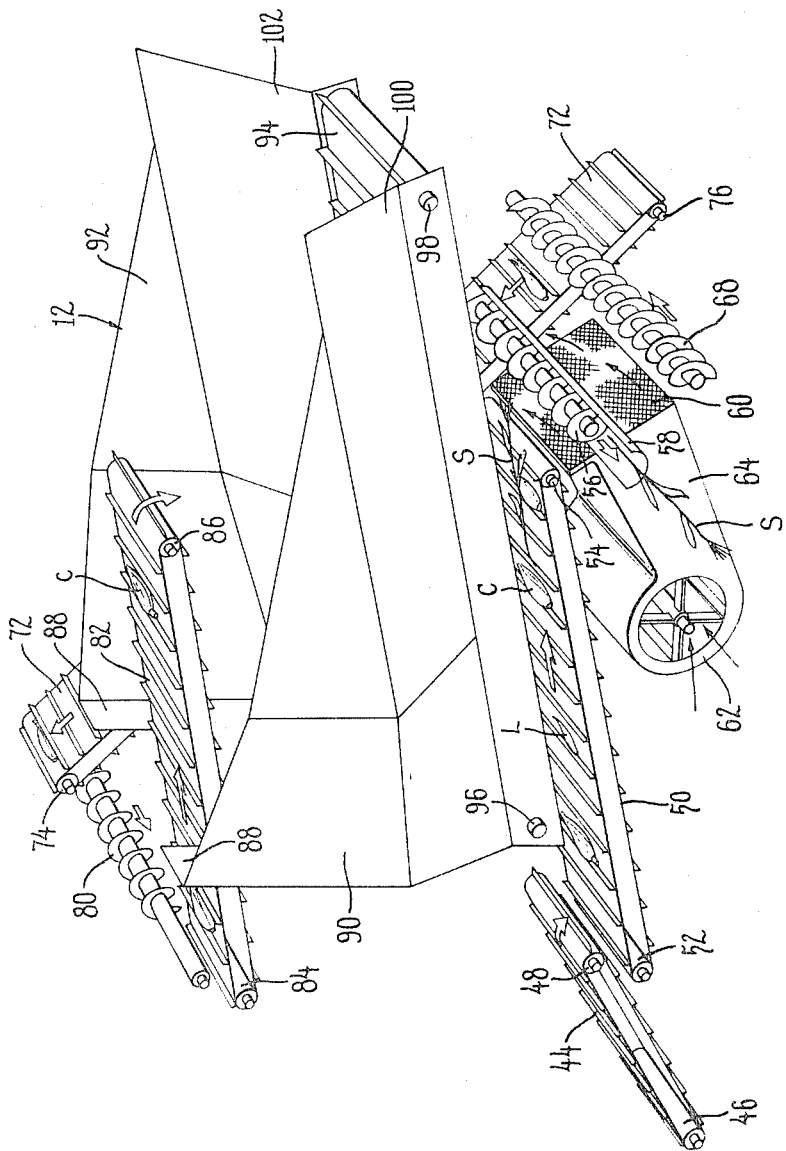

3,628,316

SELF-PROPELLED SWEET CORN HARVESTER

This invention relates generally to a corn picker. More specifically, the invention relates to a self-propelled sweet corn picker for harvesting green sweet corn for human consumption.

In recent years combine harvester threshers have been adapted to harvest and thresh field corn in one operation by replacing the header unit of standard grain combines with row crop harvesting heads. These row crop harvesting heads have snapping units, each of which includes a pair of snapping rolls and a pair of gathering chains, for each row of corn. Many combines have sufficient capacity to utilize row crop harvesting heads with snapping units for up to 8 rows of corn. This development has greatly improved field corn harvesting over the prior corn harvesting methods.

The harvesting methods used before the use of a combine harvester thresher with a row crop harvesting head consisted of utilizing a one or two row corn picker. These corn pickers were either pulled by a tractor or mounted on a tractor. The picked ears of corn were conveyed from the picker to a wagon which was pulled behind the corn picker. Wagons filled with ears of corn had to be pulled to a storage area where the ears were placed in a corn crib to dry. After the corn dried, a corn sheller was used to shell the ears of corn stored in the corn cribs. These corn harvesting methods used prior to the use of the combine harvester thresher with a multiple row harvesting head required more handling of the material since the harvesting steps and threshing steps were not performed by one machine. Also the one and two row tractor pulled or tractor mounted corn pickers are slower and in many cases less efficient than the multiple row corn harvesting heads used on combines today.

The use of the combine harvester thresher with a high capacity OF THE PREFERRED EMBODIMENT head has revolutionized field corn harvesting. Unfortunately, the sweet corn industry has not been able to utilize these advancements. Most sweet corn is harvested by old 1 and 2 row pickers which are either mounted on a tractor or pulled behind a tractor. The inefficiency of the corn pickers presently used to pick green sweet corn is especially critical since sweet corn must be harvested at precisely the correct time to be used for human consumption. If sweet corn is not harvested and delivered to the cannery within a few hours of the time it is ready to be picked, it cannot be used by the cannery for canning purposes. Another critical problem faced by the sweet corn industry is damage to the ears which occurs during picking and handling. Green ears of sweet corn are easily damaged and damaged ears cannot be used for canning.

Accordingly, an object of this invention is to provide a self-propelled, large capacity, highly efficient green sweet corn harvester.

Another object of this invention is to provide a green sweet corn harvester which utilizes a fast efficient multiple row harvesting head which will limit damage to the ears of green corn.

Still another object of this invention is to provide a corn picker with an integral storage bin for ears of unhusked green corn and a conveyor assembly to unload the bin.

A further object of this invention is to provide a corn picker with a stalk ejector and a blower to separate trash from the unhusked ears of corn.

A still further object of this invention is to provide a row crop harvester with a frame, an elevator assembly pivotally attached to the front of the frame, a row harvesting head with a plurality of snapping units and a harvesting head collecting conveyor attached to the elevator assembly, each snapping unit including snapping rolls and gathering chains, an apparatus to raise and lower the snapping units, a conveyor assembly to convey ears of green corn from the row harvesting head to the rear, a cleaning means that includes a stock ejector, a bin, a conveyor assembly to convey unhusked ears of green corn from the cleaner to the bin, a bin unloading conveyor assembly, an engine mounted on the frame, and power transmission means to transmit power from the engine and drive the harvesting head, the various conveyors and the cleaning means.

These and further objects, features and advantages of the present invention will become apparent to those skilled in the art as the nature of the invention is better understood from the following detailed description particularly when read with reference to the accompanying diagrammatic drawings in which:

FIG. 1 is a side elevation of a row crop harvester with portions broken away;

FIG. 2 is an enlarged fragmentary schematic perspective view showing the various conveyors, the cleaning apparatus and the bin; and The self-propelled green sweet corn harvester of this invention as shown in the drawings includes a carriage to support and transport the mechanisms. The carriage includes a frame 14 supported on wheels. A pair of front wheels 16 are driven to propel the harvester. The rear wheels 18 support the rear of the harvester and can be turned to change the direction of movement of the harvester. An operator's platform 20 is mounted high on the front portion of the harvester. The operator's platform has a steering wheel 22 for turning the wheels 18. A seat 24 is provided on the operator's platform 20 for the operator. A railing 26 is provided to protect the operator while on the operator's platform. A ladder 27 is connected to one side of the operator's platform. In addition to the oprator's platform, the carriage also has an engine to operate the various mechanisms of the harvester carried in a compartment 28 adjacent to the operator's platform 20.

The multiple row harvesting head 10 is essentially a row crop harvesting head of the type shown in U.S. Pat. No. 3,271,940. Only minor changes are necessary to adapt harvesting heads for dry field corn for use in harvesting green ears of sweet corn. The multiple row harvesting head 10 has a separate snapping unit for each row of corn. The snapping units each have two snapping rolls 30 and a pair of opposed gathering chains 32 mounted above the snapping rolls. Snout assemblies with hinged snouts 34 and panel members 36 are provided to guide the corn stalks between the snapping rolls 30 and the gathering chains 32 of each snapping unit. An auger 38 is mounted, transverse to the direction of travel of the harvester, at the rear of the snapping units, in the multiple row harvesting head 10 to collect the ears of corn from the snapping units and convey them to the elevator assembly 40.

The elevator assembly 40 includes an elevator housing 42. A continuous chain and slat type conveyor 44 is entrained around the lower shaft 46 and the upper shaft 48 inside the elevator housing 42. The multiple row harvesting head is rigidly attached to the front end of the elevator housing 42. The rear end of the elevator housing 42 is pivotally attached to the frame 14 of the carriage to pivot about a horizontal axis through the upper shaft 48. A hydraulic cylinder (not shown) is provided to pivot the elevator housing 42 about the axis through the upper shaft 48 to raise and lower the multiple row harvesting head 10.

A continuous conveyor assembly with a slat and chain type continuous conveyor 50 is mounted on the frame 14. The conveyor 50 is entrained about a shaft 52 located below and slightly to the front of the upper shaft 48 in the elevator housing 42. The continuous conveyor 50 is also entrained about a shaft 54 which is mounted on the frame 14 above and to the rear of shaft 52. The ears of corn and other crop material which are collected and conveyed to the elevator assembly 40 by the auger 38 are elevated by the continuous conveyor 44. The crop material falls from the continuous conveyor 44 onto the continuous conveyor 50 which in turn conveys the material to the cleaning assembly.

The cleaning assembly includes a stalk ejector and a blower. The stalk ejector includes a horizontal auger 56 and an auger trough 58 mounted to the rear of the continuous conveyor 50. Stalks carried by the continuous conveyor 50 bridge the space between the delivery end of the continuous conveyor 50 and the auger 56 and stick into the auger trough 58. The auger 56 conveys the stalks in the auger trough 58 to one side where they fall from the harvester to the ground.

The ears of green sweet corn carried by the continuous conveyor 50 fall through the space between the delivery end of conveyor assembly 50 and the auger trough 58 onto the grate 60. A stream of air from the fan 62 moves up the fan housing 64 and through the grate 60. Light trash, mixed with the ears of corn that fall onto the grate 60, is blown up and to the rear by the stream of air and is carried under the auger trough 58 and out of the harvester.

The ears of unhusked green sweet corn continue to slide down the grate 60 and into the auger trough 66. The auger 68 in the auger trough 66 conveys the ears of green corn to one side where they fall into a conveyor housing 70. A slat and chain type construction conveyor 72 is entrained about an upper shaft 74 and a lower shaft 76 inside the conveyor housing 70. The ears of unhusked green corn which fall from the auger 68 in the auger trough 66 into the conveyor housing 70 are conveyed up and toward the front of the harvester by the continuous conveyor 72.

The ears of unhusked green sweet corn, which are elevated by the continuous conveyor 72, fall into an auger trough 78. The auger 80 in the auger trough 78 conveys the ears of corn to one side where they are deposited on a chain and slat type continuous conveyor 82. The continuous conveyor 82 is entrained about a lower shaft 84 and an upper shaft 86. The ears of corn deposited on the continuous conveyor 82 are conveyed up and toward the rear of the harvester and fall into the bin 12.

The bin 12 has a front wall 88 and sidewalls 90 and 92. The bottom of the bin is formed by a chain and slat type continuous conveyor 94. The front of the bin is attached directly to the frame 14. The rear of the bin is supported above the frame 14 by the supports 104. The continuous conveyor 94 is entrained around a lower shaft 96 and an upper shaft 98. Both shafts are mounted between the sides 90 and 92 of the bin. The continuous conveyor 94 extends from the front of the bin to the rear and is substantially the same width as the bottom of the bin 12. THe lower sections 100 and 102 of the sides 90 and 92 respectively flare out from the bottom of the bin to increase the overall width of the bin.

The front wall 88 of the bin is substantially vertical to prevent bridging of the unhusked ears of green sweet corn over the conveyor 94. If all of the walls are substantially flared out from the bottom up, the ears of green corn will bridge over the continuous conveyor 94 in the corners of the bin and will not slide or fall onto the continuous conveyor 94. By having the wall 88 substantially vertical, bridging in the corners is prevented and all the ears of corn in the bin are conveyed out of the bin by the continuous conveyor 94.

The multiple row harvesting head 10, all the various conveyors, the fan 62, the auger 56 for ejecting stalks and the drive wheels 16 are all connected to the engine in the engine compartment 28 by suitable drive members. The drive members can be a series of chain, belts, pulleys, sprockets and transmissions. The various elements of the harvester can also be driven by hydraulic motors which are in turn driven by a hydraulic pump driven by the engine.

The chain and slat type continuous conveyors used to convey the ears of green corn from the harvesting head to the bin 12 and even the conveyor 94 to unload the bin must not be inclined at too great an angle above horizontal. If the continuous chain and slat type conveyors are too steep, the ears of corn will roll over the top of the slats and will not be conveyed by the slats. The conveyor 72 extends up at an of approximately 42° above horizontal. This is near the maximum angle at which the chain and slat conveyors will convey ears of corn with slats that are from one to three inches high.

During operation, the drive wheels 16 driven by an engine in the engine compartment 28 propel the harvester through the field. Each row of corn is guided in between the snapping rolls 30 and the gathering chains 32 of a snapping unit by the hinged snouts 34 and panel members 36. The ears of green corn from each snapping unit are conveyed into the auger 38 which collects all the ears and conveys them to the elevator assembly 40.

The continuous conveyor 44 in the elevator housing 42 of the elevator assembly 40 elevates and conveys the ears of green corn as shown in FIG. 2 from the multiple row harvesting head to another continuous conveyor 50. The conveyor 50 carries the ears of green corn C and other crop material such as stalks S and leafs L to a cleaning apparatus. Corn stalks S, mixed with the green ears of corn conveyed by the continuous conveyor 50, stick into the auger trough 58. The auger 56 in the auger trough 58 conveys the stalks S, in the trough 58, to one side and drops them to the ground. The ears of green corn fall through the space, between the delivery end of the continuous conveyor 50 and the horizontal auger 56, onto a grate 60. The fan 62 blows air up through the grate 60 as the ears of corn slide down the grate 60 toward the auger 68. The air passing through the grate 60 carries the light trash such as leaves L mixed with ears of green corn out of the harvester.

The cleaned ears of unhusked green corn are collected by the auger 68 which moves them to one side where they drop onto a continuous conveyor 72. The continuous conveyor 72 tonveys the ears of green corn up to another auger 80 which conveys the ears of green corn to still another continuous conveyor 82. The continuous conveyor 82 deposits the ears of corn in a bin 12 carried on the harvester. The entire bottom of the bin 12 is a continuous conveyor 94 which can be driven to unload the bin.

Although, the present invention has been illustrated with respect to the preferred embodiment, it should be understood that numerous modifications can be devised by those skilled in the art. This is particularly true as to the arrangement of the various conveyors and the cleaning apparatus.

What is claimed and desired to be secured by Letters Patent is:

1. A self-propelled corn harvester comprising a frame,
wheels to support the frame at least two of which are driven to propel the harvester,
an elevator assembly with its rear end pivotally attached to the front portion of the frame on a horizontal axis,
a harvesting head attached to the front end of the elevator assembly,
a first conveyor assembly including an endless conveyor in the elevator assembly and at least one additional endless conveyor with one or more endless chains and slats,
cleaning means mounted on the frame and arranged to directly receive ears of green corn conveyed from the harvesting head by the first conveyor assembly including a horizontal auger spaced from the delivery end of the first conveyor assembly with its axis perpendicular to the path of movement of crop material on said first conveyor assembly whereby stalks mixed with ears of green corn are received by the auger and ejected from the machine and a fan arranged to blow trash, mixed with the ears of corn, from the harvester,
a second conveyor assembly including at least one endless conveyor with one or more endless chains and slats arranged to receive unhusked ears of green corn from the cleaning means,
a bin with a bottom and walls, at least one of which is vertical, forming a container adapted to receive unhusked ears of corn from the second conveyor assembly,
a bin unloading conveyor assembly including a continuous conveyor, mounted in the bottom of the bin, having a width substantially equal to the width of the bin,
an engine mounted on the frame and
power transmission means operably connecting the engine to the drive wheels, to the harvesting head, to the first and second conveyor assemblies, to the horizontal auger in the cleaning means, to the fan in the cleaning means and to the bin unloading conveyor assembly.